US008359763B2

(12) United States Patent
Allen

(10) Patent No.: US 8,359,763 B2
(45) Date of Patent: Jan. 29, 2013

(54) APPARATUS AND METHODS FOR THE PLACEMENT OF BADGES, RIBBONS AND/OR OTHER ITEMS

(76) Inventor: Matthew Bridger Allen, Houston, TX (US)

( * ) Notice: Subject to any disclaimer, the term of this patent is extended or adjusted under 35 U.S.C. 154(b) by 461 days.

(21) Appl. No.: 12/657,417

(22) Filed: Jan. 20, 2010

(65) Prior Publication Data

US 2010/0122469 A1 May 20, 2010

Related U.S. Application Data

(63) Continuation-in-part of application No. 12/454,110, filed on May 11, 2009, now Pat. No. 8,112,898, and a continuation-in-part of application No. 12/128,179, filed on May 28, 2008, now Pat. No. 7,637,028, and a continuation-in-part of application No. 11/726,583, filed on Mar. 22, 2007, now Pat. No. 7,559,153.

(60) Provisional application No. 61/051,710, filed on May 9, 2008, provisional application No. 60/786,420, filed on Mar. 27, 2006.

(51) Int. Cl.
*G01D 21/00* (2006.01)
*A44C 3/00* (2006.01)

(52) U.S. Cl. .................. 33/653; 33/563; 33/645; 40/1.5

(58) Field of Classification Search .................... 33/653, 33/565, 645; 40/1.5
See application file for complete search history.

(56) References Cited

U.S. PATENT DOCUMENTS 2,387,986 A 10/1945 Evans
2,681,511 A 6/1954 Seton
2,795,876 A 6/1957 Hayes
2,821,787 A 2/1958 Shepard
2,847,773 A 8/1958 Herrick
2,853,791 A 9/1958 Wood
3,092,915 A 6/1963 Bell
3,129,515 A 4/1964 Best
3,331,342 A 7/1967 Herrmann
3,376,651 A 4/1968 Carey
3,406,456 A 10/1968 Schleich
3,500,550 A 3/1970 Mihai
3,760,506 A 9/1973 Tudberry
3,798,781 A 3/1974 Wolfe
4,137,657 A * 2/1979 Wardle ............................ 40/1.5
4,302,884 A 12/1981 Pallone
4,326,339 A 4/1982 Marino
4,349,966 A 9/1982 Marino et al.
D291,287 S 8/1987 Eisenhauer
5,063,684 A 11/1991 Winters
D360,149 S * 7/1995 McCubbin .................... D10/71
5,782,022 A 7/1998 Tubberville
6,311,408 B1 11/2001 Madayag
7,096,614 B1 8/2006 Williams
7,325,339 B2 2/2008 Jordan
7,559,153 B2 7/2009 Allen (Continued)

*Primary Examiner* — Christopher Fulton
(74) *Attorney, Agent, or Firm* — Alberto Q. Amatong, Jr.; The Amatong Law Firm, PLLC

(57) ABSTRACT

A template is provided for positioning at least one ribbon assembly on a garment at a predetermined position relative to the pocket. The template has a template body having a generally two-dimensional profile that is removably positionable on the front of the garment at least partially above the pocket. The template also has ribbon assembly positioning guides positioned on the template body to locate a predetermined position of a ribbon assembly on the garment in spaced relation with the pocket and with the template body. The ribbon assembly positioning guide includes a protrusion extending outwardly from the template and configured to support the ribbon assembly at a position at least partly coincidental with the predetermined position of the ribbon assembly. In other words, when the ribbon assembly is supported on the protrusion, the ribbon assembly is at least partly in the predetermined position.

16 Claims, 9 Drawing Sheets

U.S. PATENT DOCUMENTS

| | | | | |
|---|---|---|---|---|
| 7,587,839 | B1 | 9/2009 | Winter | |
| 7,637,028 | B2 | 12/2009 | Allen | |
| 8,112,898 | B2 * | 2/2012 | Allen | 33/653 |
| 2006/0137229 | A1 | 6/2006 | Jordan | |
| 2007/0266500 | A1 | 11/2007 | Allen | |
| 2007/0294924 | A1 | 12/2007 | Schriver | |
| 2008/0222816 | A1 | 9/2008 | Allen | |
| 2009/0307917 | A1 | 12/2009 | Allen | |

* cited by examiner

APPARATUS AND METHODS FOR THE PLACEMENT OF BADGES, RIBBONS AND/OR OTHER ITEMS

The present application claims the benefit of the filing date of, and is a continuation-in-part of, U.S. patent application Ser. No. 12/454,110, filed May 11, 2009, now issued as U.S. Pat. No. 8,112,898 B2 on Feb. 14, 2012; which claims priority to U.S. Provisional Application No. 61/051,710, filed May 9, 2008, and is a continuation-in-part of U.S. patent application Ser. No. 12/128,179, filed May 28, 2008, now issued as U.S. Pat. No. 7,637,028 on Dec. 29, 2009; which claims priority to U.S. Provisional Application No. 61/051,710, filed May 9, 2008, and is a continuation-in-part of U.S. patent application Ser. No. 11/726,583, filed on Mar. 22, 2007, now issued as U.S. Pat. No. 7,559,153 on Jul. 14, 2009; which claims priority to U.S. Provisional Patent Application No. 60/786,420, filed Mar. 27, 2006, the disclosures of all of which are hereby incorporated by reference herein in their entireties and for all purposes.

FIELD OF THE DISCLOSURE

The present disclosure relates generally to methods and apparatus for locating or placing items on carriers. In some embodiments, for example, the items are military badges and/or ribbons and the carriers are service uniforms.

BACKGROUND

It is often desirable to specifically locate or position one or more item on a carrier thereof. Some examples of "carriers" are uniform garments, simulated and artificial garments, f lags, display boards and objects that are ornamental or useful, or a combination thereof. Some examples of "items" are badges, ribbons, medals, awards and/or pins. For example, organizations, such as uniformed and public safety services, typically require that insignia be positioned at specific locations on uniforms worn by its members.

For one particular example, the current regulations of the United States Marine Corps (USMC) for proper positioning of insignia worn on USMC uniforms can be found in the Department of the Navy, MARINE CORPS ORDER P1020.34G MCUB, dated Mar. 31, 2003, particularly, without limitation, Chapter 5, which is incorporated by reference herein in its entirety, and more particularly Pages 5-22, 5-23, 5-35 and 5-40. Presently, all U.S. Marines are required to qualify with the rifle and must wear the appropriate rifle marksmanship badge (expert, sharpshooter or marksman) on designated garments. Under current regulations, each rifle marksmanship badge includes a holding bar having back-facing spikes used to secure the badge to the carrier, such as above the left breast pocket of a uniform blouse or shirt. A series of small metal ringlets connect the holding bar to the main section of the badge. The size of the holding bars and spike location are the same for all three present versions of the rifle marksmanship badges.

A U.S. Marine may also qualify with the pistol. In such instance, present USMC regulations require the Marine to wear both a rifle and a pistol marksmanship badge on particular uniforms. However, when a member has not qualified on the pistol, the only badge that will be worn is the rifle marksmanship badge. In such case, current USMC regulations require the rifle marksmanship badge to be centered over the left breast pocket of the carrier with the bottom edge of the holding bar ⅛th inch above the top edge of the pocket.

Similar to the rifle marksmanship badge, there are presently three levels of pistol qualification: expert, sharpshooter and marksman. Current embodiments of these badges have similar components as the rifle marksmanship badges described above, including a holding bar having back-facing spikes and a series of small metal ringlets connecting the holding bar to the main section of the badge. The holding bars on all three types of pistol marksmanship badges are identical in terms of size and spike placement.

Under present USMC regulations, the pistol marksmanship badges, including holding bars, are smaller than those of the rifle marksmanship badges. When wearing both a rifle and a pistol marksmanship badge, present USMC regulations require the badges be symmetrically placed on a line, centered over the breast pocket, with a ¾ inch space between the adjacent holding bars. The bottom edge of the rifle holding bar must be ⅛th inch above the top edge of the left breast pocket. As the pistol badge holding bar is smaller than the holding bar of the rifle badge, present regulations require the top edge of the pistol holding bar to be in-line with the top edge of the rifle holding bar.

When wearing one or more marksmanship badges, present USMC regulations require that any earned service ribbons are also worn. The service ribbons must be centered over the left breast pocket with the bottom edge of the lowest ribbon(s) positioned ⅛th inch over the top edge of the marksmanship badge(s) holding bar.

However, the present disclosure is not limited to placement of USMC or other military badges and ribbons on service uniforms. Moreover, the present disclosure is not limited by the type, construction or components of garment or other carrier with which the disclosure may be used, or the badge(s), ribbon assembly(ies), medals or other items that may be placed on the carrier. For example, the present disclosure may be used with the placement of other types of badges or ribbons of any military service or other organization on any uniform garment or any other form of carrier (flag, display board, ornament, useful object, simulated garment, etc.), as well as the placement of any other type of items that need to be specifically positioned at any desired location on any carriers thereof.

In positioning and locating one or more items on a carrier, difficulties may be encountered. For example, the item(s) may be difficult or cumbersome to handle and/or precisely position because of the shape, configuration or small size of the item. Precise positioning may also be difficult due to the small or awkward area or nature of the item where the item is to be placed. When more than one item is required to be positioned, the small or differing sizes, shapes and or configurations of the items may be a hindrance to precisely locating and affixing the items. Likewise, if the items are to be positioned proximate to one another, the close desired positioning of the items may make handling and precise positioning difficult. If the precise positioning requires measuring distances or dimensions, making the correct measurements and/or effectively using such measurements may be difficult. For another example, it may be unduly time-consuming to properly precisely position the item(s) on the carrier. In instances where time is in short supply, such as in military-type settings, the importance and burden of correctly placing items on carriers, such as ribbons on uniform shirts, in a short time, could be a source of stress, and the accuracy and correctness of placement may be sacrificed.

In many instances, the items must be removed and/or replaced on repetitive basis, such as to allow for cleaning or maintenance of the carriers, requiring repeated occurrences of precise positioning. Thus, any of the above or other problems associated with precise positioning may be recurring frequently.

It should be understood that the above-described examples, features and/or disadvantages are provided for illustrative purposes only and are not intended to limit the scope or subject matter of the claims of this patent application or any patent or patent application claiming priority hereto. Thus, none of the appended claims or claims of any related application or patent should be limited by the above discussion or construed to address, include or exclude the cited examples, features and/or disadvantages, except and only to the extent as may be expressly stated in a particular claim.

Accordingly, there exists a need for apparatus and methods useful to assist in the accurate positioning of items on carriers.

BRIEF SUMMARY

In one aspect, a template for placing an item (e.g., a ribbon assembly) on a carrier (e.g., a uniform garment) at a predetermined position relative to the carrier (e.g., a position adjacent a top edge of a pocket). The template includes a template body, at least one measurement reference mark for positioning the template body at a predetermined template body position relative to the carrier, and on item positioning guide for positioning the item at a predetermined position relative to the template body such that when the template body is positioned at the predetermined template body position relative to the carrier and the item is positioned at the predetermined position relative to the template body, the item is positioned at the predetermined position relative to the carrier. The item positioning guide includes a vertical position guide having a protrusion extending outwardly from the template body and including or defining a support surface. The support surface is configured to support the item, when the template body is at the predetermined template body position, at an elevation corresponding to the predetermined position (i.e., predetermined elevation) of the item relative to the carrier.

In one aspect, a template is provided for positioning at least one ribbon assembly on a garment at a predetermined position relative to the pocket. The template has a template body having a generally two-dimensional profile that is removably positionable on the front of the garment at least partially above the pocket. The template also has ribbon assembly positioning guides positioned on the template body to locate a predetermined position of a ribbon assembly on the garment in spaced relation with the pocket and with the template body. The ribbon assembly positioning guide includes a protrusion extending outwardly from the template and configured to support the ribbon assembly at a position at least partly coincidental with the predetermined position of the ribbon assembly. In other words, when the ribbon assembly is supported on the protrusion, the ribbon assembly is at least partly in the predetermined position. For example, the ribbon assembly may be at the proper elevation (i.e., spaced from the pocket).

In some embodiments, the present disclosure involves an apparatus useful for properly positioning at least one badge on the front of a garment at least partially over a pocket of the garment. The badge includes at least first and second engagers extending therefrom for engagement with the garment. The apparatus includes a template removably positionable on the front of the garment at least partially above the pocket. The template includes at least one horizontal alignment indicator useful for centering the template relative to the pocket, a front face, at least one top edge and at least one bottom edge. A bottom edge of the template is alignable along a top edge of the pocket so that when the bottom edge of the template is aligned along the top edge of the pocket, the badge is properly positionable on the garment. At least one raised portion protrudes from the front face of the template, and is capable of seating at least a part of a first badge. When the corresponding first badge portion is seated by the raised portion(s), the first badge is properly positionable relative to the garment. At least one cut-out extends from at least one top edge of the template and terminates between the top edge and at least one bottom edge. First and second engagers of a first badge are moveable and positionable within the at least one cut-out and may be engaged with the garment therethrough. After the badge is properly positioned on the garment, the template is moveable away from the badge without disturbing the position of the at least one badge on the garment.

In various embodiments, the present invention involves a removable template useful for determining correct placement of at least one item at a desired location on the front of a carrier. The template is elongated and includes a single member without moving parts and a front face, top and bottom edges and left and right sides. First and second pairs of opposing measurement reference points are located proximate to the left and right sides of the template, respectively, and are useful for assisting in horizontally positioning the template on the front of the carrier. A first outline on the front face of the template is formed in the shape of at least part of a first item so that the first item may be positioned relative to the first outline for proper alignment of the first item over the template. At least one protruding portion extends from the front face and is associated with the first outline. The at least one protruding portion is capable of seating at least a part of the first item so that when the corresponding part of the first item is seated by at least one the protruding portion, the first item is properly positionable relative to the garment. First and second cut-outs each extend from the top edge of the template and provide large areas wherein first and second rear-facing pins of the first item are concurrently moveable, respectively, regardless of the distance between the pins and positions thereof on the first item. After the item is properly positioned upon and engaged with the carrier, the template may be moved downwardly and away from the tem and removed without disturbing the position thereof.

In many embodiments, the present invention involves a method for properly positioning at least a first item having at least first and second rear-facing engagers on the front of a garment at least partially over a pocket of the garment. This method utilizes an elongated template that includes at least one raised portion protruding from the front face thereof and which is capable of seating at least part of the first item on the template. A bottom edge of the template is aligned along a top edge of the pocket. The first item is placed at least partially onto the template so that a designated part of the first item is seated on the template by the raised portion(s). The first and second rear-facing engagers of the first item are placed through first and second cut-outs formed in the template and engaged with the garment. The template may be slid down and away from the at least first item without disturbing the position thereof.

Accordingly, the present disclosure includes features and advantages which are believed to enable it to advance the art of placing items on carriers. Characteristics and advantages of the present disclosure described above and additional features and benefits will be readily apparent to those skilled in the art upon consideration of the following detailed description and referring to the accompanying drawings.

BRIEF DESCRIPTION OF THE DRAWINGS

The following figures are part of the present specification, included to demonstrate certain aspects of embodiments of the present disclosure and referenced in the detailed description herein.

DETAILED DESCRIPTION

Figure 1:
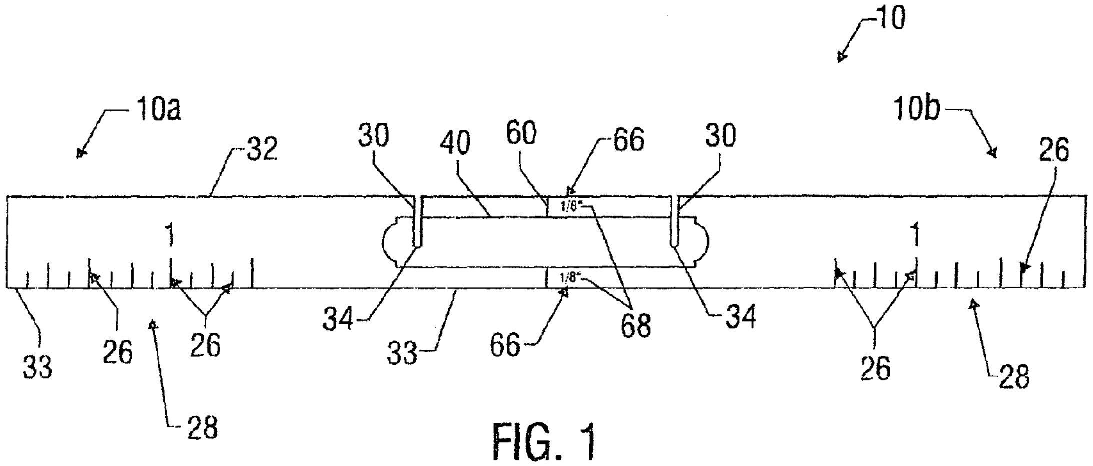
FIG. 1 is a front view showing an apparatus useful for assisting in correctly placing one or more items at a desired location on a carrier in accordance with an embodiment of the present disclosure.

Characteristics and advantages of the present disclosure and additional features and benefits will be readily apparent to those skilled in the art upon consideration of the following detailed description and referring to the accompanying figures. It should be understood that the description herein and appended drawings are of various exemplary embodiments and are not intended to limit the appended claims or the claims of any patent or patent application claiming priority to this application. On the contrary, the intention is to cover all modifications, equivalents and alternatives falling within the spirit and scope of the claims. Many changes may be made to the particular embodiments and details disclosed herein without departing from such spirit and scope.

In the description below and appended figures, common or similar features are indicated by like or identical reference numerals or, in the absence of a reference numeral, are evident based upon the appended figures and/or description herein. The figures are not necessarily to scale and certain features and certain views of the figures may be shown exaggerated in scale or in schematic in the interest of clarity and conciseness. It should also be noted that reference herein and in the appended claims to components and aspects in a singular tense does not necessarily limit the present disclosure to only one such component or aspect, but should be interpreted generally to mean one or more, as may be suitable and desirable in each particular instance.

Referring initially to FIG. 1, an embodiment of a template 10 useful to assist in determining the correct placement of one or more items onto a carrier in accordance with the present disclosure is shown. The term "correct placement" and variations thereof as used herein means the desired placement of the item on the carrier, such as in accordance with pertinent rules and/or regulations. If desired, the template 10 may be constructed for ease of use, ease of storage, longevity or a combination thereof. For example, the template 10 of FIG. 1 is thin and rectangular in outer-shape and constructed of a rigid and durable material, such as plastic. The particular embodiment shown has dimensions of approximately 6½" long by approximately ⅝" wide to assist in the placement of a USMC marksmanship badge and, if desired, one or more ribbon assemblies over the breast pocket of a USMC garment, such as a uniform shirt. However, the template 10 may have any desired shape, dimensions, construction and configuration. Further, a template in accordance with the present disclosure is not limited to the placement of USMC marksmanship badges and ribbons, but can be used for placing any item 14 on any carrier Still referring to FIG. 1, the template 10 of this embodiment may include at least one measurement reference point 26, such as to assist in positioning the template 10 over, upon or relative to the carrier 10. If included, the measurement reference point 26 may have any desired form and configuration. For example, the measurement reference point 26 may include any combination of lines, numbers, indentations, protrusions or other marking(s) and, if desired, may be color-coded or otherwise designed to facilitate easy use. In this embodiment, a set 28 of ruler-like reference points 26 is formed in or printed onto the front of the template 10 proximate to each side 10$a$, 10$b$ of the template 10 and is useful in centering the template 10 at the desired location over the item 14, such as relative to the breast pocket 22 (see e.g., FIG. 3) of the USMC shirt 24.

Still referring to FIG. 1, the template 10 may include at least one positioner to assist in positioning the item on the carrier. The positioner may have any suitable form and configuration. For example, the positioner may be a cut-out 30 extending downwardly from the top edge 32, upwardly from the bottom edge 33 or from a side edge of the template 10 to a lip 34. Each positioner may be selectively located on the template 10 to assist in allowing correct placement of the item 14 onto the carrier 12. In this embodiment, a pair of aligned slit-like cut-outs 30 with corresponding lips 34 is provided. Each cut-out 30 of this example is capable of allowing the passage therethrough of an engager 36 of an item 14. The engager 36 may have any suitable form, shape and configuration. In this example, the engager 36 is a rear rear-facing spike (see e.g., FIG. 4) of a USMC marksmanship badge 16.

When included, the cut-out 30 may have any suitable form, dimensions and configuration. For example, the cut-out 30 may open at the top edge 32 (e.g., FIG. 1), bottom edge 33 or a side edge of the template 10, or a combination thereof, to allow ease of removal of the template 10 or any other desired purpose. For another example, the cut out 30 may have multiple lips 34 or other features to provide multiple placement positions for the corresponding item 12. If desired, the width of the cut-out 30 may vary along its length. For example, the cutout 30 may have an overall V-shape (not shown). For another example, the cut-out 30 may have a curved shape (not shown). For yet another example, the cut-out 30 may include a circular or other-shaped bulb-like portion (not shown) at the location of the lip 34.

Figure 2:
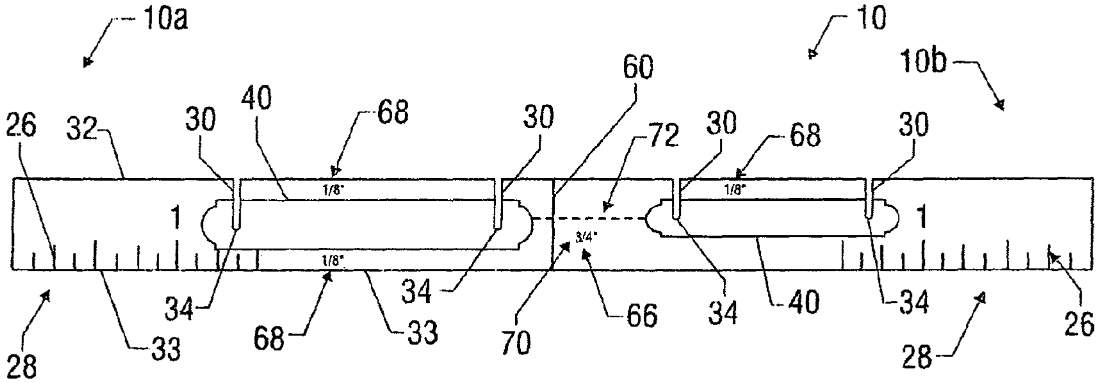
FIG. 2 is a front view showing an apparatus useful for assisting in correctly placing one or more items at a desired location on a carrier in accordance with another, embodiment of the present disclosure.

In some embodiments, the template 10 may include multiple sets of cut-outs 30 to assist in the correct placement of more than one item 14 on a carrier 12. In the embodiment of FIG. 2, for example, the template 10 is configured to assist in the correct placement of two USMC marksmanship badges 16 (see e.g., FIG. 3), such as a USMC rifle marksmanship badge 54 and a USMC pistol marksmanship badge 56, onto a carrier 12. In this example, the pair of cut-outs 30 closest to the left side 10*a* of the template 10 is useful for positioning the rifle badge 54 and the cut-outs 30 closest to the right side 10*b* of the template are useful for positioning the pistol badge 56. Thus, the present disclosure is not limited by the quantity, shape, configuration, arrangement or dimensions of the cut-out 30, when included.

Still referring to FIG. 1, if desired, at least one outline 40 of an item 14 may be formed in, or provided or printed onto, the template 10 to assist in correct placement of the item or a portion thereof. The outline 4U may have any suitable shape, size, configuration, or location. If desired, the outline 40 maybe color-coded or otherwise designed for ease of use. In the embodiment of FIG. 1, the outline 40 matches the outer shape of the holding bar 48 of a marksmanship badge 50 (see e.g., FIG. 3). The outline 40 of this example is located relative to the cut-outs 30 to assist in ensuring the correct placement of the badge 50 over the template 10 and the engagers 36 in the cut-outs 30. In other embodiments, multiple outlines 40 to match different shaped items or parts thereof, such as different shaped badge holding bars 44 (see e.g., FIG. 3), may be associated with the same cut-out 30 or pair of cut-outs 30, or different cut-outs 30 on the template 10.

In the example of FIG. 2, the template 10 includes outlines 40 associated with each pair of cut-outs 30. The outline 40 associated with the left set of cut-outs 30 matches the current outer shape of the holding bar 48 of a USMC rifle marksmanship badge 54 (see e.g., FIG. 3), while the outline 40 associated with the cut-outs 30 nearest to the right side 10*b* of the template 10 matches the current outer shape of a holding bar 49 of a USMC pistol marksmanship badge 56. Thus, the present disclosure is not limited by the quantity, shape, configuration, arrangement or dimensions of the outline, when included.

Still referring to FIG. 1, if desired, the template 10 may be useful for the correct placement of one or more item 14 on the carrier 12 at a desired location proximate to (e.g., above, below or adjacent to) the template 10 when the template is (temporarily) positioned on the carrier 12. For example, the template 10 may have one or more vertical positioning guides for correct vertical positioning of the item 14 proximate to the template 10. In the embodiment of FIG. 1, the top edge 32 and width of the template 10 may serve as vertical positioning guides for correctly vertically positioning one or more items 14 directly above the location of the template 10. For another example, the template 10 may be provided with one or more horizontal positioning guides for correct horizontal positioning of the item proximate to the template 10. For example, the measurement reference points 26 may serve as a horizontal positioning guide for item(s) 14 to be positioned above or below the location of the template 10. For another example, the template 10 may instead or also include an intermediate reference 60 provided on or in the template 10 to indicate a different location for positioning an item 12 proximate to the template 10. In the embodiment of FIG. 1, the intermediate reference 60 is at the mid-point of the length of the template 10 for centering an item 14 above the template 10.

In the example of FIG. 2, the template 10 may be used for positioning one or more ribbon assemblies 18 on the USMC shirt 24 above the breast pocket 22. As used herein, the term "ribbon assembly" includes one or more military or other similar ribbon and/or corresponding backing member. In this example, the top edge 32 and width of the template 10 serve as vertical positioning guides to provide the proper spacing for placement of the ribbon assembly 18. When the template 10 is properly positioned on the shirt 24 relative to the pocket 22, the placement of the ribbon assembly 18 above and abutting the top edge 32 of the template 10 provides the correct vertical placement of the ribbon assembly 18 on the shirt 24. The intermediate reference 60, provided at the mid-point of the length of the template 10, serves as a horizontal positioning guide to center the ribbon assembly 18 over the template 10 and properly horizontally position the ribbon assembly 18 on the shirt 24. Thus, the present disclosure is not limited by quantity, shape, configuration, arrangement or dimensions of the vertical and/or horizontal positioning guides, when included.

Referring still to FIG. 2, if desired, the template 10 may include one or more indicator 66 to indicate a particular spacing or distance value or other, dimension. The indicator(s) 66 may have any suitable form and configuration. In this embodiment, for example, upper and lower vertical badge spacing indicators 68 are provided on the template 10. These values represent the correct distance between a properly positioned USMC marksmanship badge 16 and adjacent components, or items, that may be located above and/or below the badge 16, respectively. In this particular configuration, the vertical badge spacing indicators 68 each provide a value of ⅛", which represents the distance between the holding bar 44 of a correctly positioned USMC marksmanship badge 16 and (i) any ribbon assemblies 18 (e.g., FIG. 3) that may be correctly positioned above the badge 16, and (ii) the top of the pocket 22, respectively. This particular embodiment also includes a horizontal badge spacing indicator 70, which represents the correct spacing between correctly placed adjacent badge holding bars 44 (e.g., FIG. 3), and a spacer line 72, which illustrates the space represented by the indicator 70. However, the present disclosure is not limited by quantity, shape, configuration, arrangement or dimensions of the indictors, when included.

An embodiment of a method of correctly placing at least one item on a carrier in accordance with the present disclosure will now be described with reference to FIG. 1. It should be understood, however, that the methods of neither the present disclosure nor the appended claims are limited to use with the illustrated template 10 of FIG. 1. In this embodiment, the template 10 is properly positioned at the desired location on the carrier using the measurement reference point(s) 26. For example, if the carrier is a USMC garment, such as a uniform shirt and the item is a USMC rifle marksmanship badge, the exemplary template 10 may be placed flat and face up on the shirt above the breast pocket so that its bottom edge 33 abuts the top edge of the pocket. The corresponding reference points 26 on the left and right sides 10*a*, 10*b* of the template 10 are aligned with the left grip right edges of the pocket, respectively.

After the template 10 is properly positioned relative to the carrier, the item is engaged over the template 10 at the appropriate location to ensure correct vertical and horizontal placement of the item. For example, the holding bar of a two-spike USMC rifle marksmanship badge may be positioned face up over the outline 40 of the template 10. The left and right spikes extending from the rear of the holding bar may be seated against the lips 34 of the left and right cut-outs 30 of the template 10, respectively. The spikes may thereafter be pressed through the carrier, correctly placing the badge on the carrier. If desired, the badge may be secured to the carrier, such as with the use of spike covers. However, the present disclosure may be used for correctly placing items that do not include spikes.

If the template 10 is also useful for assisting in correctly placing of one or more item on the carrier proximate to the template 10 when the template is (temporarily) positioned on the carrier, such item(s) may be correctly positioned on the carrier. For example, if the template 10 includes one or more vertical positioning guide for correct vertical positioning of the item above the template 10 on the carrier, the vertical positioning guide is used to vertically position the item on the carrier. If the template 10 includes one or more horizontal positioning guide for correct horizontal positioning of one or more item above or below the template 10 on the carrier, the horizontal positioning guide is used to horizontally position the item on the carrier. For example, one or more ribbon assemblies may be correctly placed onto the USMC uniform shirt by centering the ribbon assembly on the intermediate reference 60 of the template and abutting the lower edge of the lowermost ribbon assembly with the top edge 32 of the template 10. The ribbon assemblies may thereafter be secured to the carrier, as desired.

If desired, the template 10 may be removed without disturbing the position of the badge and, if included, the ribbon assembly. In this example, the template 10 may be slid downwardly away from the badge and carrier, disengaging the cut-outs 30 from the spikes and removing the template 10.

An embodiment of a method of correctly placing at least one item on a carrier in accordance with the present disclosure will now be described with reference to FIGS. 2-4. It should be understood, however, that the methods of neither the present disclosure nor the appended claims are limited to use with the illustrated template 10 of FIG. 2-4. In accordance with this embodiment, referring to FIG. 3, the subject carrier 12, such as a service uniform shirt 24, may, if desired, be placed on an at least partially flat surface with the desired placement area, such as the breast pocket 22 area, facing up. The template 10 is placed flat and face up on the shirt 24 above the pocket 22 so that its bottom edge 33 is flush with the top edge 23 of the pocket 22. The measurement reference point(s) 26 are used to center the template 10 over the pocket.

Figure 4:
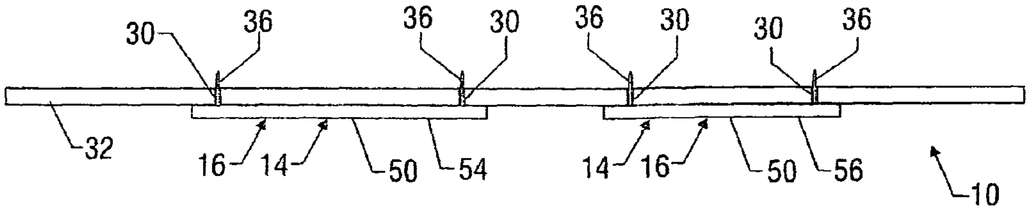
FIG. 4 is an isolated top view of the apparatus shown in FIG. 3 engaged with the USMC rifle and pistol marksmanship badges.

If the template 10 is used to correctly place a USMC rifle marksmanship badge 54 and a USMC pistol marksmanship badge 56 on the shirt 24, the respective engagers 36, such as the spikes extending from the back of the holding bars 44 of the subject badges 54, 56, are positioned at the respective lips 34 of the corresponding cut-outs 30 of the template 10, such as shown in FIG. 4. If one or more outline 40 (FIG. 2) is included on the template 10, the badge holding bars 44 are aligned over the corresponding outlines 40 to ensure proper positioning of the engagers 36. Pressure may be applied to the badges 54, 56, if necessary, to drive the engagers 36 into or through the shirt 24.

Figure 3:
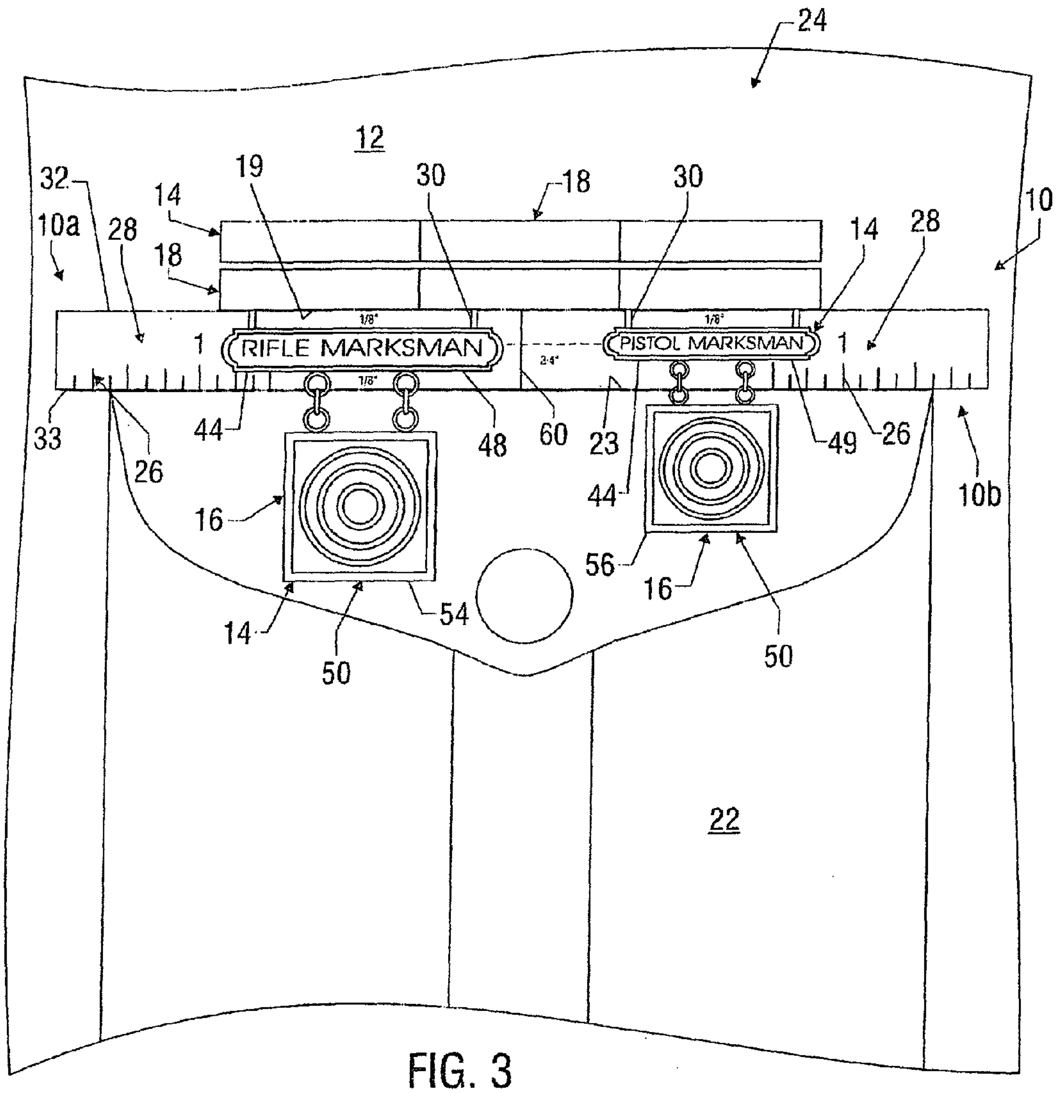
FIG. 3 is a front view of the apparatus of FIG. 2 shown used in the placement of USMC rifle and pistol marksmanship badges and service ribbons on a USMC uniform shirt in accordance with an embodiment of the present disclosure.

Still referring to FIG. 3, it one or more ribbon assemblies 18 are to be positioned, the ribbon assembly 18 is centered over the center reference 60 of the template 10 for correct horizontal alignment. The bottom edge 19 of the ribbon assembly 18 (or lowermost row of multiple vertical ribbon assemblies 18) is aligned flush with and abutting the top edge 32 of the template 10. The ribbon assembly 18 may be engaged with the carrier 12, as is know.

Referring to FIG. 4, the illustrated template 10 may be removed by moving it downward, moving the cut-outs 30 away from the engagers 36 and disengaging the template 10. The badges 54, 56 may be secured to the carrier 12 as is known, such as with spike backings.

Figure 5:
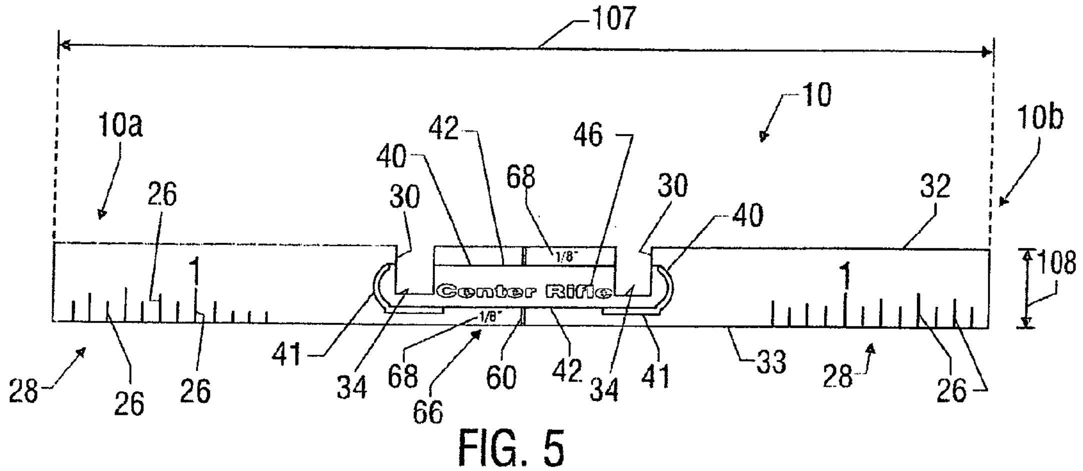
FIG. 5 is a front view showing another embodiment of an apparatus useful for assisting in correctly placing one or more items at a desired location on a carrier in accordance with the present disclosure.
Figure 6:
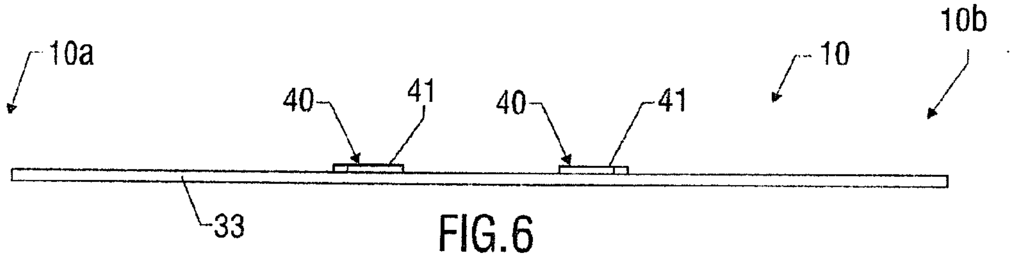
FIG. 6 is a bottom view of the apparatus shown in FIG. 5.
Figure 7:
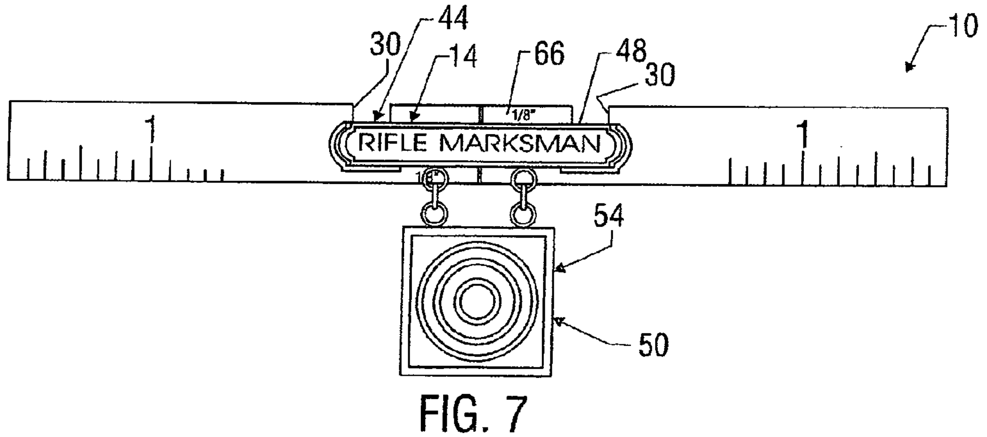
FIG. 7 is a front view of the apparatus shown in FIG. 5 showing an item properly positioned therewith.

Now referring to FIGS. 5 and 6, the outline 40 of this embodiment is at least partially raised, or protruding, from the template 10. In this example, the outline 40 includes two protruding portions 41 located at the left and right lower corners of the outline 40. As shown in FIG. 7, the illustrated protruding portions 41 are positioned and sized to snugly seat an item 14, such as the holding bar 48 of a USMC rifle marksmanship badge 54, therebetween and within the outline 40. However, when included, the raised outline 40 or protruding portion(s) 41 may have any desired shape, form and dimensions and may protrude in any manner and to any desired extent along the entire outline 40 or at desired locations along the outline 40. Further, the outline 40 may be raised or protrude for any desired purpose.

Still referring to FIG. 7, the illustrated protruding portions 41 are sized and located to precisely fit around the left and right bottom corners of an item 14, such as the holding bar 48, seated therebetween, while still allowing the template 10 to be moved away and removed without disturbing the position of the item 14. The protruding portion(s) 41 of this embodiment serve as the primary item positioning feature of the template 10. When the template 10 is properly positioned on an item (not shown), the positioning of the badge holding bar 48 between precise location of the engagers 36 of the badge holding bar 48 within the corresponding cut-outs 30. Accordingly, the engagers 36 of a badge 54 properly positioned with the use of this embodiment may not rest against the respective lips 34 of the cut-outs 30.

Referring again to the example of FIG. 5, in addition or alternately, the outline 40 may include one or more indented portion 42 which may be capable of assisting in seating the item 14. The indented portion(s) 42 of an outline 40 may have any suitable shape, form, dimensions and location. In the embodiment of FIG. 5, the indented portions 42 are provided along all the portions of the outline 40 that do not include a protruding portion 41 or cut-out 30. When an item 14, such as the badge holding bar 48, is positioned between the protruding portions 41, the indented portions 42 may assist in properly seating the bar 48. It should be understood, however, that protruding portions 41 and/or indented portions 42 are not required.

Figure 8:
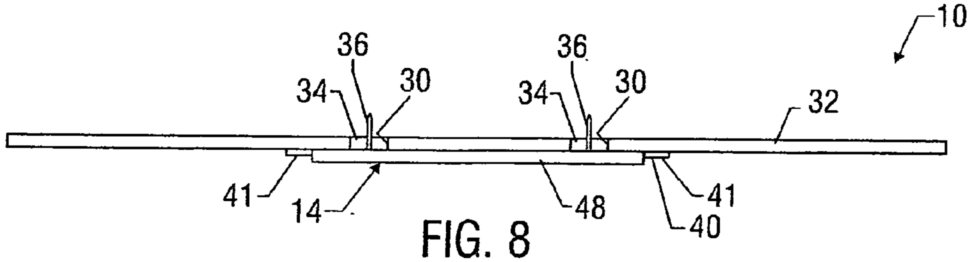
FIG. 8 is a top view of the apparatus shown in FIG. 7.

Still referring to FIG. 5, if desired, the cut-outs 30 may be provided with a large shape, or area, for any desired purpose. In this embodiment, for example, the cut-outs 30 have a square or rectangular shape, providing for a large area within which the engager(s) 36 (e.g., FIG. 8) of the rifle marksmanship badge 54 may be positioned. Each of the cut-outs 30 of this embodiment may, for example, have a width of approximately 7.00 centimeters (measured from left to right) and a height of approximately 9.00 centimeters (measured down from the top edge 32).

The illustrated large cut-outs 30 will allow for the proper positioning of a rifle marksmanship badge 54, regardless of the distance between, precise location and position of the engagers 36 on the respective badge holding bar 48. For example, the template 10 of FIG. 5 may be used for proper positioning of rifle marksmanship badges 54 of any presently known manufacturer, or having any known or expected positioning of its engagers 36.

Referring still to FIG. 5, if desired, one or more marker 46 may be included on the template 10 to assist in proper positioning of an item 14 relative to the template 10. In this example, the marker 46 is the text "Center Rifle" provided on the template 10 within the outline 40. This particular marker 46 serves as a guide for a user to know where to place the holding bar of a rifle marksmanship badge. However, the user of one or more marker 46 is not required.

Figure 9:
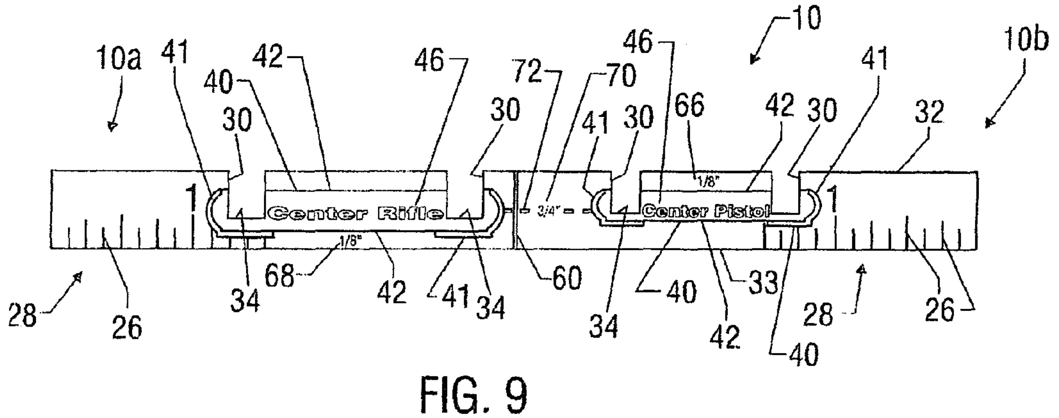
FIG. 9 is a front view showing another embodiment of an apparatus useful for assisting in correctly placing one or more items at a desired location on a carrier in accordance with the present disclosure.
Figure 10:
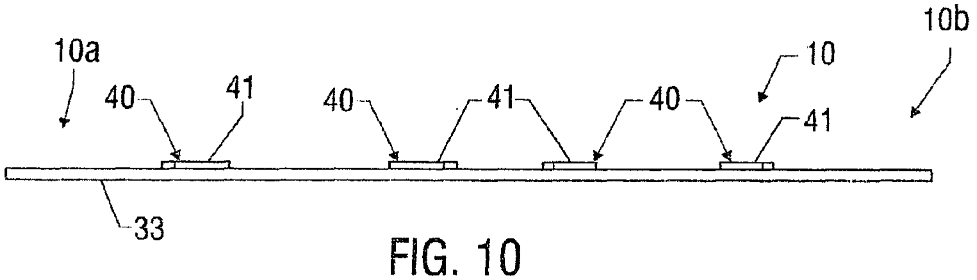
FIG. 10 is a bottom view of the apparatus shown in FIG. 9.
Figure 11:
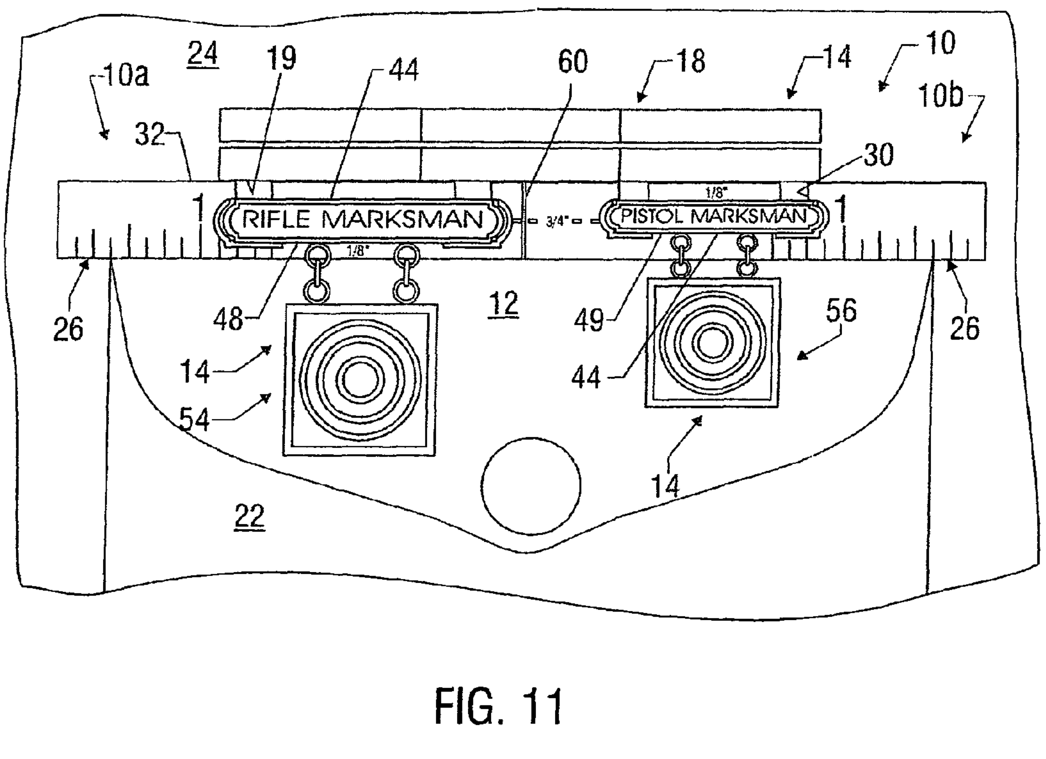
FIG. 11 is a front view the apparatus of FIG. 9 shown used in the placement of USMC rifle and pistol marksmanship badges and service ribbons on a USMC uniform shirt in accordance with an embodiment of the present disclosure.

Now referring to FIGS. 9-11, an embodiment of a template 10 is shown having two outlines 40 with corresponding protruding portions 41 and indented portions 42 similarly as described above. The outline 40 closest to the left side 10*a* of the template 10 is useful for positioning a USMC rifle marksmanship badge 54 (e.g., FIG. 11) and includes a marker 46 with the text "Center Rifle". The outline 40 closest to the right side 10*b* of the template 10 is useful for positioning a USMC pistol marksmanship badge 56 (e.g., FIG. 11) and includes a marker 46 having the text "Center Pistol". This embodiment also includes a second set of cut-outs 30 associated with the outline 40 near the right side 10*b* of the template 10. In this example, each of the second set cut-outs 30 may, if desired, have a width of approximately 5.00 centimeters and a height of approximately 7.00 centimeters.

Figure 12:
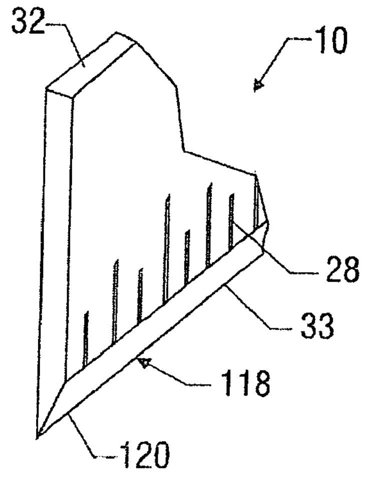
FIG. 12 is a partial perspective view of an apparatus useful for assisting in correctly placing one or more items at a desired location on a carrier and having a gripper in accordance with an embodiment of the present disclosure.
Figure 14:
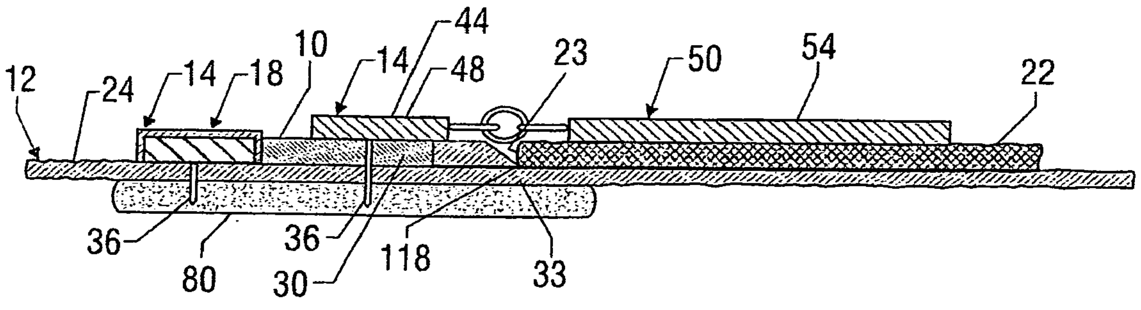
FIG. 14 is partial cross sectional view of an embodiment of an apparatus shown as used for assisting in correctly placing multiple items at desired locations on a carrier in accordance with the present disclosure.

In another independent aspect of the present disclosure, referring to FIG. 12, the bottom edge of the template 10 may include one or more gripper 118 to assist in the snug, accurate and/or secure positioning of the template 10 relative to the carrier 12 (e.g., FIG. 14). The gripper(s) 118, in included, may have any suitable form, configuration, dimensions and construction. In the embodiment of FIG. 12, for example, the gripper 118 is the bottom edge 33 of the template 10 having a wedged or pointed cross-sectional shape across its entire length (e.g., length 107, FIG. 5). A thin tip 120 is thus formed along the edge 33. When the template 10 of FIG. 12 is positioned over a pocket 22 (e.g., FIG. 14), for example, the tip 120 can firmly dig into, or grip, the top seam of the pocket 22. In other embodiments, the gripper 118 may not extend across the entire length of the template 10. For example, the gripper 118 may extend along only one or more portions of the bottom edge 33 of the template 10, include one or more spiked-portions (not shown) or have other portions extending from the template 10. Thus, the present disclosure is not limited by the particular form of the gripper(s) 118. Moreover, the gripper 118 is not required in all embodiments of the present disclosure.

The extent to which the gripper 118 actually engages the carrier 12 may vary for any suitable reason, such as, for example, the desire to easily remove the template 10 from the carrier 12 after placement of the items 14 thereupon. Also, if necessary or desired, the height of the template 10 (e.g., height 108, FIG. 5) may be increased or otherwise adjusted to accommodate for any portion of the gripper 118, such as the tip 120, that will extend into the carrier 12 during use or that otherwise alters the true height of the template 10.

Figure 13:
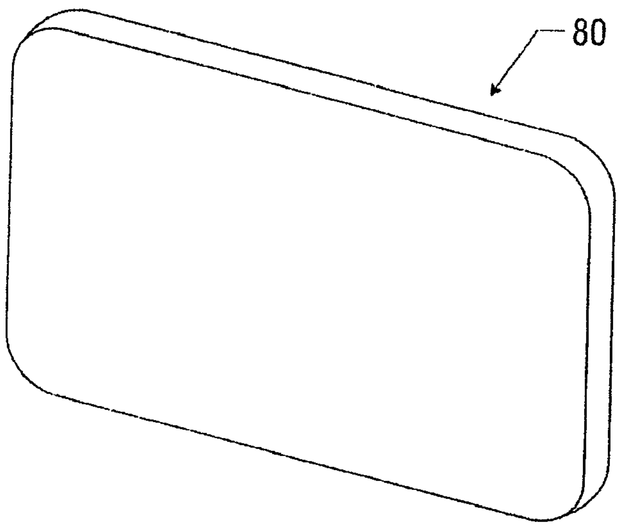
FIG. 13 is a perspective view of an embodiment of a back support in accordance with the present disclosure.

Now referring to FIGS. 13-14, in yet another independent aspect of the present disclosure, one or more back support 80 may be included for any desired reason. For example, the back support 80 may be included to assist in accurate positioning of the item(s) 14 on the carrier 12. For another example, the back support 80 may be included to support the items 14 when engaged on the carrier 12. The back support 80 may have any suitable form, configuration, construction, dimensions and other attributes. For example, the back support 80 may be a piece of cardboard, foam or other material having dimensions equal or greater that the total height and width of the area of the carrier 12 that will bear the items 14. The back support 80 of FIG. 12 has a generally rectangular shape and is constructed of foam. If desired, the back support 80 may be adjustable in size. For example, the back support 80 of FIG. 12 may be cut to more precisely match the area of the carrier 12 that will carry the items 14. However, a back support 80 is not required.

An embodiment of a method of correctly placing at least one item 14 on a carrier 12 in accordance with the present disclosure will now be described with reference to FIGS. 9, 11 and 14. It should be understood, however, that the methods of neither the present disclosure nor the appended claims are limited to use with the illustrated template 10 of FIG. 9, 11 or 14. Referring to the embodiment of FIG. 14, the subject carrier 12, such as a USMC uniform shirt 24, may be placed on an at least partially flat surface with the desired placement area, such as the breast pocket 22 area, facing up. If one or more back support 80 is used, the back support 80 is placed underneath the carrier 12 under the area that will carry the item(s) 14.

The template 10 is properly positioned at the desired location on the carrier 12. For example, if the carrier is a uniform shirt 24, the exemplary template 10 may be placed flat and face up on the shirt above the left breast pocket 22 so that its bottom edge 33 is flush with or abuts the top edge 23 of the pocket 22. If the template 10 includes one or more gripper 118, the gripper 118 is engaged with the carrier 12. For example, if the gripper 118 extends from the bottom edge 33 of the template 10, the gripper 118 is engaged with the top of the pocket 22. The corresponding measurement reference points 26 (e.g., FIG. 9) on the left and right sides 10*a*, 10*b* of the template 10 are aligned with the left and right edges of the pocket 22, respectively, to center the template 10 over the pocket 22.

Still referring to the example of FIG. 14, after the template 10 is properly positioned relative to the carrier 12, each item 14 to be placed onto the carrier 12 is engaged over the template 10 at the appropriate location to ensure correct vertical and horizontal placement of the item 14. If the exemplary template 10 is used to correctly place a USMC rifle marksmanship badge 54 and a USMC pistol marksmanship badge 56 on the shirt 24, for example, the respective badge holding bars 44 are each placed face up over the appropriate marker 46 (e.g., FIG. 9) and within or over the corresponding outline 40. If the outlines 40 include one or more protruding portions 41 and/or indented portions 42, such as in FIGS. 9 and 11, each item 14, such as the holding bar 44, is placed within or between the corresponding protruding portions 40 and/or within the indented portion(s) 42. The engagers 36, such as mounting pins or spikes, extending from the back of the holding bars 44 of the item 14 are thus positioned within the corresponding cut-outs 30 of the template 10. The items 14 may be fully engaged with the carrier 12, such as by applying pressure to the front of the badge holding bars 48, 49 to drive the engagers 36 through the shirt 24 and back support(s) 80 (if included), or otherwise as desired.

If the template 10 is also useful for assisting in correctly placing of one or more item 14 on the carrier 12 proximate to the template 10, such item(s) may be correctly positioned. If the template 10 includes one or more vertical and/or horizontal positioning guide for positioning of the item 14 above the template 10 on the carrier 12, such guide(s) may be used to position the item 14 on the carrier 12. For example, as shown in FIG. 11, if one or more ribbon assemblies 18 are to be positioned, the ribbon assembly 18 may be centered over the intermediate reference 60 of the template 10 for correct horizontal alignment. For proper' vertical alignment, the bottom edge 19 of the ribbon assembly 18, or lowermost row of multiple vertical ribbon assemblies 18 may be aligned flush with and abutting the top edge 32 of the template 10. The ribbon assembly 18 may be engaged with the carrier 12 and back support 80 (if included), as desired.

The illustrated template 10 may be removed without disturbing the position of the items 14, such as by sliding the template 10 generally downwardly away from the item(s) 14. As desired, the items 14 may be further secured to the carrier 12 and back support 80, if included. For example, backings, clasps, fasteners, spike covers or other connectors may be engaged with the end of the engagers 36 extending on the inside of the carrier 12 or back support 80.

Examples of the present disclosure thus offer advantages over the prior art. However, each of the appended claims does not require each of the components and acts described above and is in no way limited to the above-described examples and methods of assembly and operation. Any one or more of the above components, features and processes may be employed in any suitable configuration without inclusion of other such components, features and processes. Moreover, the present disclosure includes additional features, capabilities, functions, methods, uses and applications that have not been specifically addressed herein but are, or will become, apparent from the description herein, the appended drawings and claims.

FIGS. 15-17 and FIGS. 20-24 are provided to illustrate a template (10, 10') equipped with an enhanced ribbon assembly positioning guide and a method of positioning the ribbon assembly at a desired, predetermined position relative to a pocket of garment or other carrier. The ribbon assembly guide includes a vertical positioning guide operable to receive and/or direct the ribbon assembly to a predetermined vertical position or elevation relative to the template or body of the template, thereby positioning the ribbon assembly at a predetermined vertical position or elevation relative to the pocket (when the template body is pre-positioned at its predetermined position relative to the garment and the pocket). The vertical positioning guide in FIGS. 15-17 and also in FIGS. 20-24 include a support surface upon which the ribbon assembly may be rested to place it at a position co-incidental with the predetermined vertical position. In these embodiments, the support surface or the structure of the vertical positioning guide may also embody a horizontal positioning guide such as a center referencing mark for aligning the ribbon assembly with the template body and the pocket in accordance with its predetermined position.

It should be noted that, in these descriptions, the ribbon assembly or template is said to be in a position at least partly coincidental with its predetermined position if its vertical or horizontal position or orientation is consistent with its vertical or horizontal position or orientation at its predetermined position relative to the garment or pocket.

Figure 15:
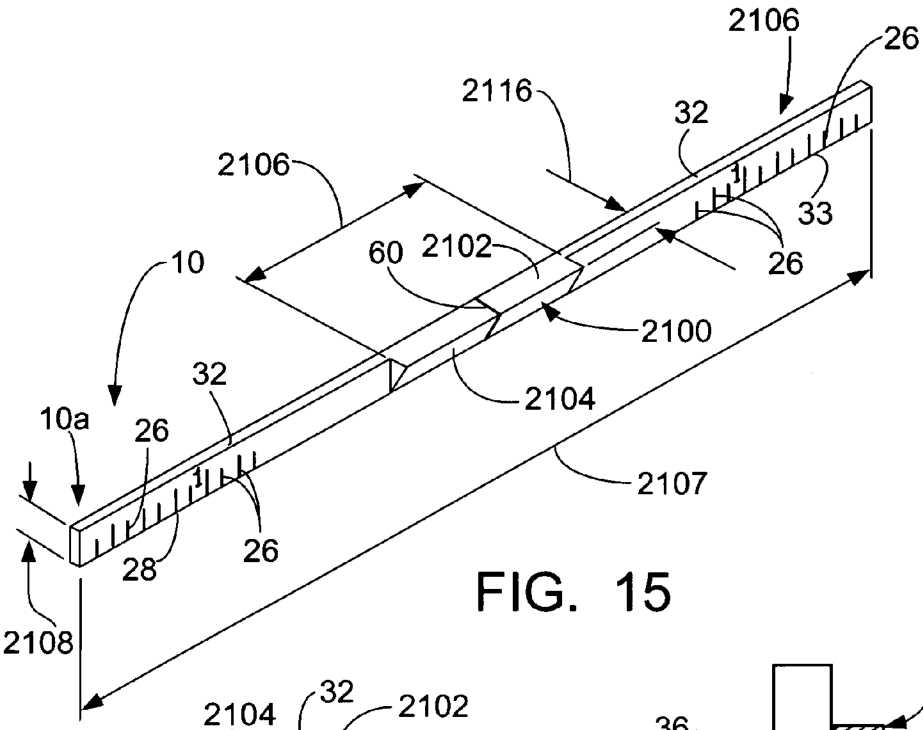
FIG. 15 is a simplified illustration of a template, according to the present invention.

Now referring to the embodiment of FIG. 15, in another aspect of the present disclosure, the template 10 may include a ribbon rest 2100 useful for any suitable purpose. For example, the ribbon rest 100 may protrude from the template 10 to serve as a sort of "shelf" upon which the bottom of one or more ribbons may be placed for positioning on and engagement with the carrier 12.

The ribbon rest 2100 may have any suitable form, configuration and construction. In the embodiment shown, the ribbon rest 2100 is a triangular-shaped protrusion 2104 extending outwardly from the center front of the template 10. The exemplary protrusion 2104 has a flat top surface 2102 designed to accommodate a ribbon assembly 18 (e.g., FIGS. 16, 17) as the assembly preferably extends out at a approximately ninety degree angle from the top edge 32 of the template 10.

The ribbon rest 2100 may be constructed of any suitable material, such as the same material as the template 10. In some embodiments, the ribbon rest 2100 may include one or more separate components connected together and/or connected to the template 10, such as with glue, epoxy or mechanical fasteners, by snap locking or sliding engagement or any other suitable arrangement, as is or become known. In other embodiments, the ribbon rest 2100 may be integrally formed during molding or manufacturing as part of the template 10. Thus, the present disclosure is not limited by the construction of the ribbon rest 2100.

The ribbon rest 2100 may likewise have any suitable dimensions. For example, the ribbon rest 2100 may extend across the entire or only part of the length of the template 10. In the embodiment of FIG. 15, the ribbon rest 2100 has a length 2106 that is the same as the length of a standard military ribbon, such as a U.S. Navy ribbon.

Likewise, the ribbon rest 2100 may protrude from the template 10 for any desired distance. In the example of FIG. 15, the ribbon rest 2100 protrudes from the template 10 so that the top surface 2102 has a width 2116 of approximate ½ inch to accommodate the combined width (and positioning) of a standard military (e.g., U.S. Navy) ribbon, ribbon rack and its engagers, such as spikes. However, the top surface 2102 may have any desirable width 2116. The template 10 upon which the ribbon rest 2100 is used may also have any suitable dimensions. In the embodiment of FIG. 15, for example, the template 10 has a length 2107 of 6½ inches and a height 2108 of ¼ inch, so that when the bottom edge 33 of the template 10 is placed abutting the top edge of the breast pocket 22 of a U.S. Navy shirt 110, a ribbon assembly 18 positioned on the shirt 110 above the ribbon rest 2100 as described above will be ¼ inch above the pocket 22. (Currently, U.S. Navy regulations require positioning of the bottom row of ribbons to be centered ¼ inch above the left breast pocket of a uniform shirt.).

Figure 16:
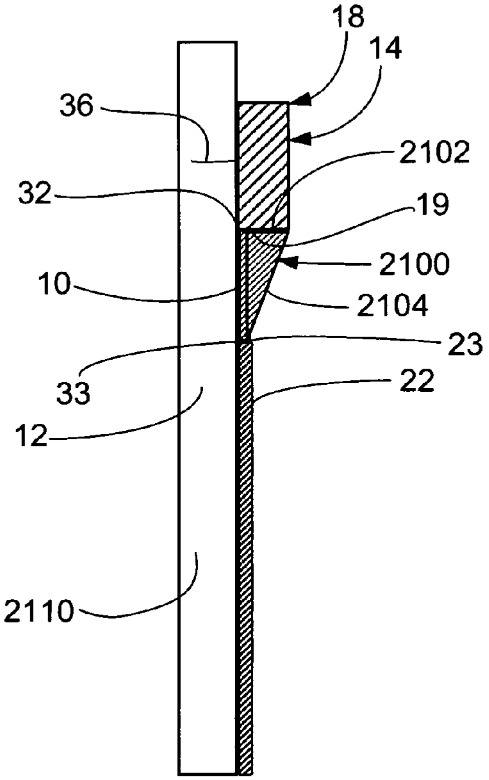
FIG. 16 is a side view of the template in FIG. 15, according to the present invention.
Figure 17:
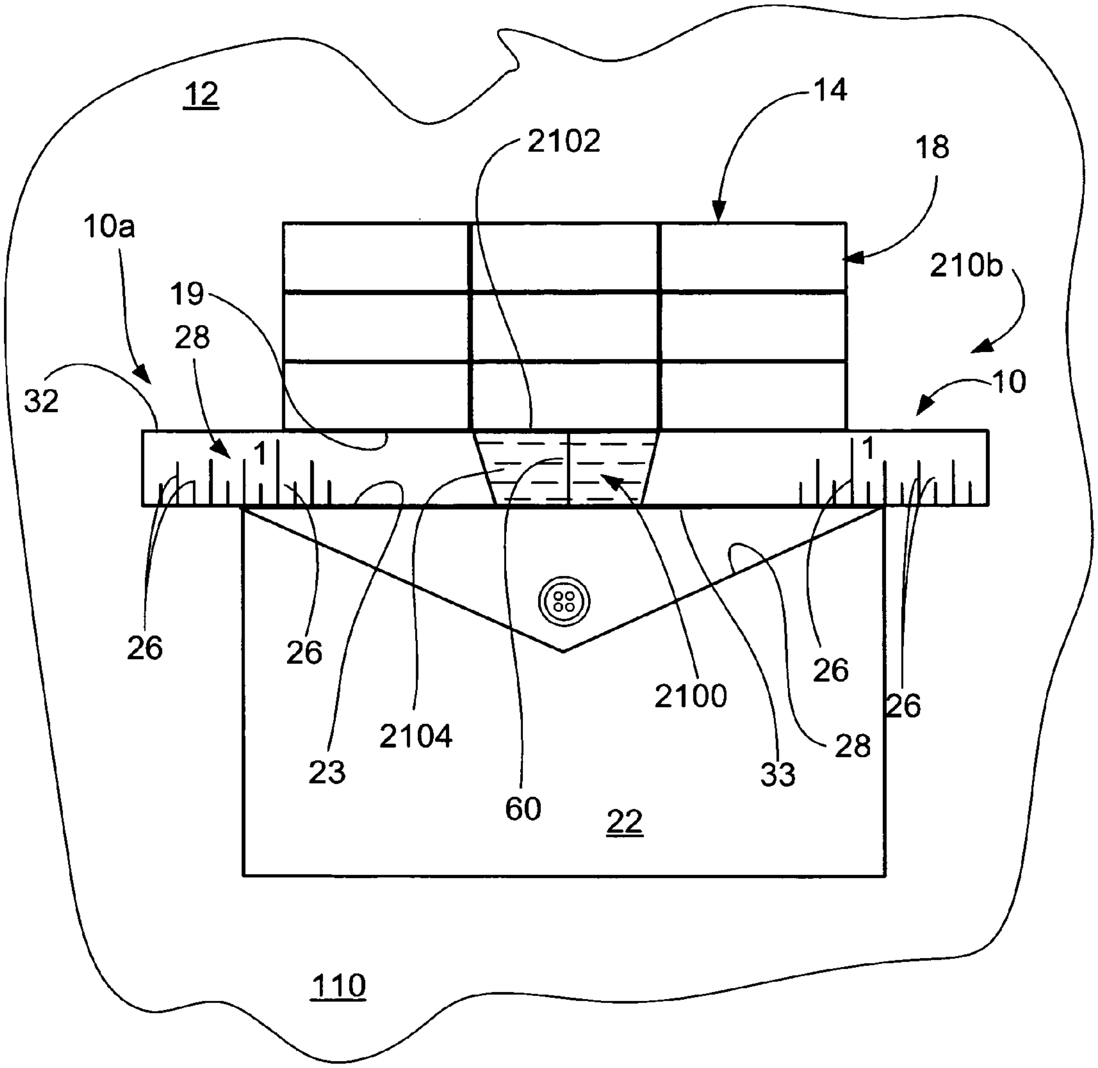
FIG. 17 is a front view of the template as applied in FIG. 16.

In an exemplary embodiment of a method of correctly placing at least one item 14 on a carrier 12 with the use of the embodiment of FIGS. 15-17, the carrier 12, such as the shirt 110, is ideally first placed on a flat surface with the subject area (e.g., the breast pocket 22 of shirt 110) facing up. If one or more back support (not shown) is used, it is placed below the carrier 12. The template 10 is aligned with the top edge 23 of the breast pocket 22, such as described above. The measurement reference points or marks 26 are used to center the template 10 over the top edge 23 of the pocket 22. The ribbon assembly 18 is centered on the intermediate reference 60, if included, or otherwise on the ribbon rest 2100. The bottom edge 19 of the ribbon assembly 18 is made flush (e.g., generally normal to) with the top surface 2114 of the ribbon rest 2100. The ribbon assembly 18 may then be pushed toward the carrier 12, engaging the engagers 36 of the ribbon assembly 18 with the carrier 12. If desired, clasps or other connected may be engaged over the back support to secure the ribbon assembly to the carrier 12 and back support. The template 10 may be easily removed without disturbing the positioning of the ribbon assembly 18 on the carrier 12.

Figure 19:
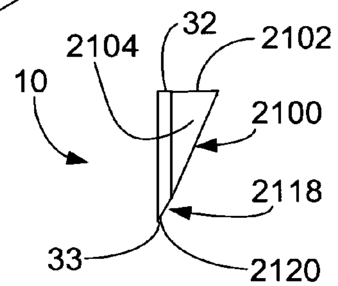
FIG. 19 is a side view illustration of the bottom edge and a gripper in FIG. 17.
Figure 18:
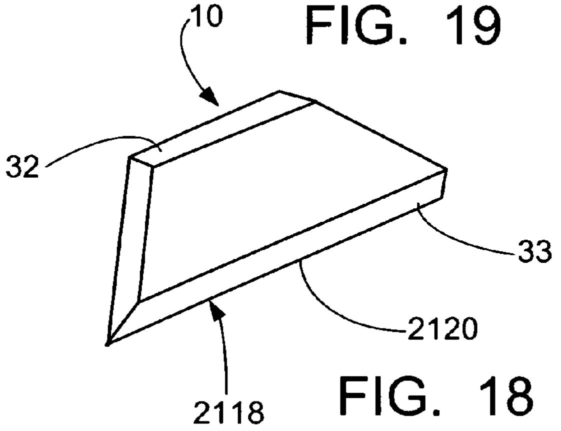
FIG. 18 is a partial view of a bottom edge of the template in FIG. 17.

In another aspect of the present disclosure, referring to FIG. 18, the bottom edge of the template 10 may include one or more gripper 2118 to assist in the snug, accurate and/or secure positioning of the template relative to the carrier 12. The gripper(s) 2118 may have any suitable form, configuration, dimensions and construction. In the embodiments of FIGS. 18 and 19, for example, the gripper 2118 is the bottom edge 3.3 of the template 10, which is wedged or pointed across its entire length to form a thin tip 2120 at the end of the edge 33. When the template 10 of FIG. 18 or 19 is positioned over a pocket 22 (e.g., FIG. 16), for example, the tip 2120 can firmly dig into, or grip, the top seam of the pocket 22. In other embodiments, the gripper 2118 may not extend across the entire length of the template 10, such as along one or more portions of the bottom edge 33, or may instead include one or more spikes (not shown) or other portions extending from the bottom edge 33. Thus, the present disclosure is not limited by the particular form of the gripper(s) 2118.

The extent to which the gripper 2118 actually engages the carrier 12 may vary based upon the desire to easily remove the template 10 from the carrier 12 after placement of the items 14 thereupon. Also, if necessary or desired, the height of the template 10 (e.g., height 2108, FIG. 15) may be increased or otherwise adjusted to accommodate for any portion of the gripper 2118, such as the tip 2120, that will extend into the carrier 12 during use or that otherwise alters the true height of the template 10.

Figure 24A:
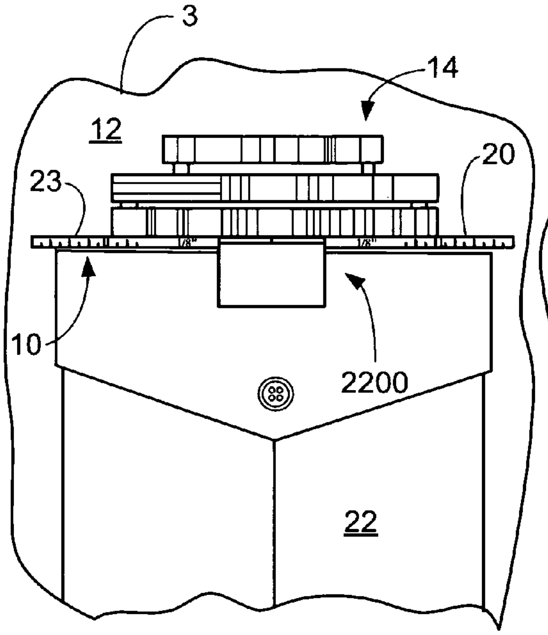
FIGS. 24A and 24B are simplified illustrations of a template as applied to a carrier, according to the present disclosure.
Figure 24B:
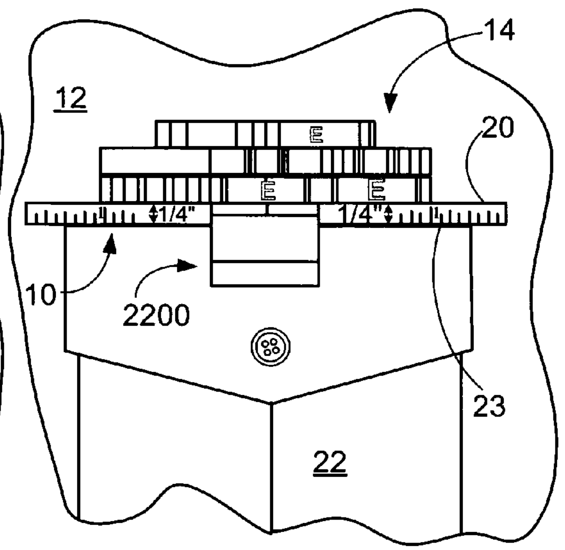
Figure 23:
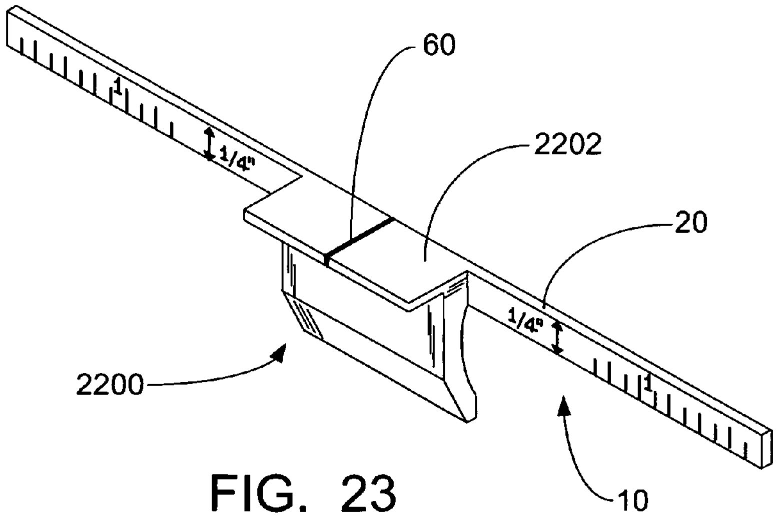
FIG. 23 is a perspective view of the template in FIG. 20.

FIGS. 20-23 present yet another template 10' according to one aspect of the present invention and operable to assist in locating or positioning a ribbon assembly on a carrier. In these Figures, a template 10' is provided having many components generally of the same type or construction as described previously and depicted in previous drawings. As with the template 10 of FIGS. 15-17, this template 10' has a template body 20 preferably with a generally flat, generally two-dimensional profile, and a ribbon rest 2200 extending from the template body 20. The ribbon rest 2200 incorporates and provides many of the features and functions previously described of the ribbon rest 2100 in FIGS. 15-17 with a few important enhancements, as described below. In particular, as with the ribbon rest 2100, the ribbon rest 2200 functions as a ribbon assembly guide and more specifically, as a vertical positioning guide that receives and/or directs the ribbon assembly to its predetermined vertical position or elevation relative to the template body 20 and the pocket 22 of the uniform garment. FIGS. 24A and 24B is provided to help illustrate the use of this alternative template 10' to correctly place an item 14, i.e. ribbon assembly 14, on a shirt 12 adjacent a pocket 22 on the shirt 12. Generally, the template 10' and the ribbon rest 2200 is used in the same manner as the template 10' and the ribbon rest 2100, again with some enhancements. Accordingly, in respect to FIGS. 20-24, the template 10' is described using like reference numerals to indicate like elements.

Referring now to FIGS. 20-23, the template 10' is equipped with a ribbon assembly positioning guide including a ribbon rest 2200 that projects or protrudes both generally horizontally and downwardly from the template body 20. In this particular embodiment, the ribbon rest 2200 may be characterized as a protrusion defining two geometric components or portions: a shelf 2230 that extends outwardly from, and in horizontal alignment with, a top edge 32 of the template body and a supporting handle 2232 that extends generally downwardly from the shelf 2230. The shelf 2230 and supporting handle 2232 extend from a central portion of the template body 20. As with the previous embodiment, the shelf 2230 defines a support surface 2202 for accommodating an item such as the ribbon assembly 14, and is preferably in alignment or flush with the top edge 32. The top surface 2202 in this embodiment is a planar surface. The planar surface 2202 is located such that, when the template body 20 is maintained at its predetermined position, the planar surface 2202 defines an elevation coinciding with the predetermined elevation of the ribbon assembly relative to the pocket. In other embodiments, the support surface may be provided by rails, multiple support points, or other surface that supports the item thereon at the desired elevation. In this respect, the ribbon rest 2200 and, more particularly, the shelf 2230 functions in very much the same way as described of the ribbon rest 2100 previously described in respect to FIGS. 15-17.

Figure 21:
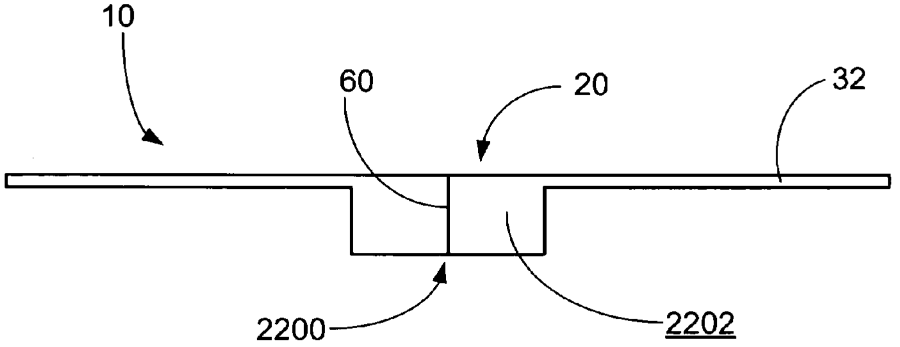
FIG. 21 is a top view of the template in FIG. 20.

As shown best by FIG. 21, the top surface 2202 of this embodiment is also provided with an intermediate reference mark or line 60. The reference mark may be used to align and center the ribbon assembly with the template body 20. When the template body 20 is at the predetermined position, i.e., centered relative to the pocket, aligning the ribbon assembly by way of the reference mark 60 centers the ribbon assembly relative to the pocket.

As illustrated, the ribbon rest 2200 is provided at the center of the template 10' lengthwise. Thus, centering of the ribbon assembly 14 on the shelf 2230 of the ribbon rest 2200 centers the ribbon assembly 14 relative to the template 10'. If the template 10' is centered relative to the pocket 22 of a carrier 12, as shown in FIGS. 24A, 24B, the ribbon assembly 14 is centered in relation to the pocket 22 and thus, is positioned at its predetermined (proper) position on the uniform.

Figure 22:
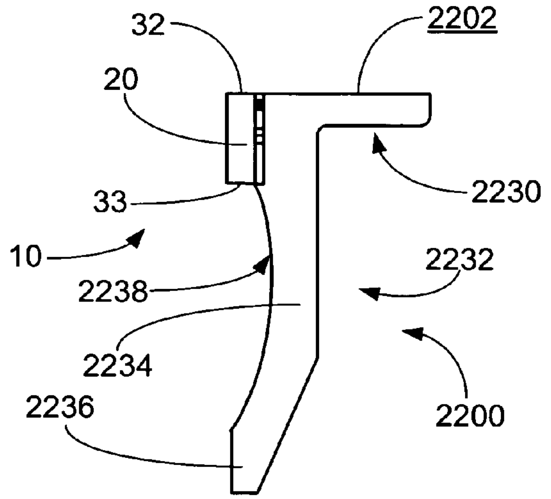
FIG. 22 is a side view of the template in FIG. 20.

The supporting handle 2232 may be further described as having a broad arm section 2234 that extends downwardly from the shelf 2230 at least partly, and initially, at a generally right angle. The supporting handle 2232 then curves and is spaced away from the carrier or pocket before terminating at a distal end, against the carrier or pocket. This arm section 2234 is sufficiently wide to provide stability and to facilitate handling. In this embodiment, the arm section 2234 includes an arch 2238 on a backside that effectively spaces the handle 2232 from the pocket or carrier during use, but maintains the robustness and strength of the arm section 2234. The arch 2238 or curvature of the angle also provides bias in the handle 2232 that creates a horizontal as well as a vertical force component when the template 10' is pressed against the garment 12 and/or pocket 22. The arch 2238 terminates at an elongated inward section or footer 2236 that leads inwardly to engage the pocket 22 during use. As best shown in FIG. 22 and in the perspective view of FIG. 23, the footer 2236 has sufficient height and length and thus, sufficient area to adequately and substantially engage the pocket 22. The wider area and engagement of the footer 2236, as opposed to an edge, helps prevent the template 10' from digging into the pocket seam, for example, and thereby, compromising the accuracy of the template 10. After engaging the bottom edge 33 of the template body 20 with a top edge 23 of the pocket 22 (see e.g., FIGS. 24A, 24B), the supporting handle 2232 may be rotated (if not already engaged) toward the pocket 22 so that the footer 2236 engages the pocket 22. This helps to secure the template body 20 at its proper position relative to the top edge 23 of the pocket 22 and the support surface 2202 (and top edge 32) at the proper predetermined elevation. The solid engagement of the footer 2236 with the pocket 22 also helps prevent the template body 20 from disengaging as the ribbon assembly 14 is supported and guided by the template 10.

The support handle 2232 adds stability and strength to the template 10' during use. The engagement of the footer 2236 with the pocket 22 helps resists the force (and the movement created) applied to the shelf 2230 or the template 10' by the user or the weight of the ribbon assembly 14. The shelf 2230 and template 10' are, therefore, less susceptible to turning or giving downwardly (and thereby, compromising accuracy). The arched support handle 2232 also provides a strong and steady portion that a user can grip and use to manipulate the template 10'. In these ways, the supporting handle 2232 eases the positioning of the template 10' relative to the pocket 22, and maintains that correct position (including the predetermined position of the ribbon assembly 14 relative to the pocket 22) during use.

Figure 20:
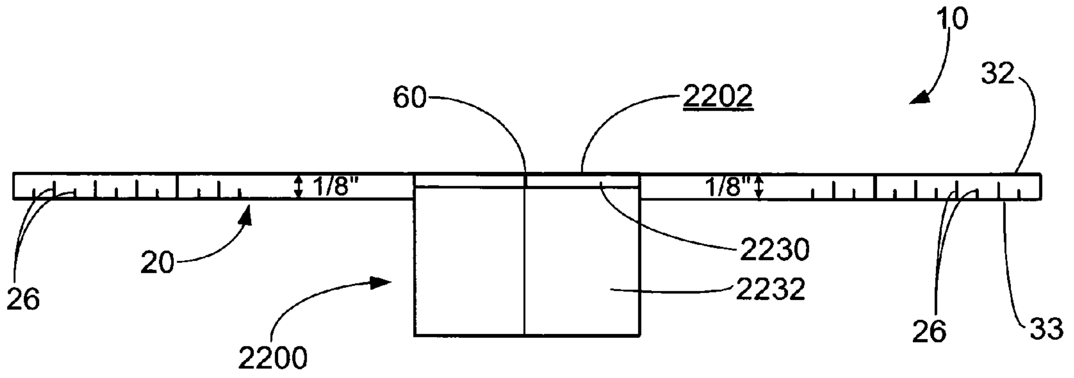
FIG. 20 is a simplified illustration and front view of a template, according to the present disclosure.

FIGS. 24A and 24B illustrate use of the template 10' in positioning and locating a ribbon assembly 14 atop a pocket 22 on a United States Marine Corp. uniform shirt 12 and a United States Navy uniform shirt 12, respectively. FIG. 24A depicts a template 10' with a ribbon rest 2200 as shown in FIGS. 20-21 and as applied to a USMC uniform. FIG. 24B shows an alternate template 10' with a ribbon rest 2200' applicable to U.S. Navy uniform requirements.

Examples of the present disclosure thus offer advantages over the prior, art. However, each of the appended claims does not require each of the components and acts described above and is in no way limited to the above-described examples and methods of assembly and operation. Any one or more of the above components, features and processes may be employed in any suitable configuration without inclusion of other such components, features and processes. Moreover, the present disclosure includes additional features, capabilities, functions, methods, uses and applications that have not been specifically addressed herein but are, or will become, apparent from the description herein, the appended drawings and claims.

The methods described above and which may be claimed herein and any other methods which may fall within the scope of the appended claims can be performed in any desired suitable order and are not necessarily limited to the sequence described herein or as may be listed in any appended claims. Further, the methods of the present disclosure do not necessarily require use of the particular examples shown and described in the present specification, but are equally applicable with any other suitable structure, form and configuration of components.

While preferred embodiments have been shown and described, many variations, modifications and/or changes of the system, apparatus and methods herein, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of this disclosure and scope of the appended claims. Thus, all matter herein set forth or shown in the accompanying drawings should be interpreted as illustrative, and the scope of this disclosure and the appended claims should not be limited to the examples described and shown herein.

The invention claimed is:

1. A template for placing an item on a carrier at a predetermined position relative to the carrier, said template comprising:

- a template body positioned about a vertical plane;
- at least one measurement reference mark for positioning the template body at a predetermined template body position relative to the carrier;
- an item positioning guide for positioning the item at a predetermined position relative to the template body such that when the template body is positioned at the predetermined template body position relative to the carrier and the item is positioned at the predetermined position relative to the template body, the item is positioned at the predetermined position relative to the carrier;
- wherein the item positioning guide includes a vertical position guide having a protrusion extending outwardly from the template body in a generally lateral direction that is generally normal to the vertical plane of the template body, the protrusion including a support surface configured to support the item, when the template body is at the predetermined template body position, at an elevation corresponding to the predetermined position of the item relative to the carrier; and
- a supporting handle extending in a generally downwardly direction from the template body, the generally downwardly direction being generally normal to the generally lateral direction, the supporting handle including a footer portion for engaging the carrier and an intermediate section positioned between the template body and the footer portion, wherein the intermediate section is spaced in the generally lateral direction away from the vertical plane of the template body and is positioned farther from the vertical plane of the template body than the footer portion.

2. The template of claim 1, wherein the positioning guide includes one or more reference marks on the support surface for centering the item relative to the template body.

3. The template of claim 1, wherein the vertical positioning guide includes the supporting handle and the supporting handle extends generally downwardly from the template body and the horizontal support surface, the footer portion being engageable with the carrier, when the template body is in the predetermined template body position, to support the template thereagainst and wherein the intermediate section is spaced outwardly in the generally lateral direction from the carrier when the template body is in the predetermined template body position and the footer portion is engaged with the carrier such that the footer portion is disposed inwardly of the intermediate section.

4. The template of claim 3, wherein the footer portion extends generally downwardly from the intermediate section.

5. A template for positioning at least one ribbon assembly on a garment at a predetermined position relative to a pocket of the garment, said template comprising:

- a template body removably positionable on the front of the garment at least partially above the pocket; and
- a ribbon assembly positioning guide for locating a predetermined position of a ribbon assembly on the garment in spaced relation with the pocket and with the template body, the ribbon assembly positioning guide including a protrusion extending outwardly from the template body and configured to support the ribbon assembly at a vertical position at least partly coincidental with the predetermined position of the ribbon assembly; and wherein the ribbon assembly positioning guide further includes a supporting handle extending generally downwardly from the template body, the supporting handle including a footer portion engageable with the carrier when the template body is positioned at the predetermined template body position relative to the carrier to support the template thereagainst and an intermediate section, wherein the footer portion is positioned at a distal end of the supporting spaced inwardly from the intermediate section to engage the carrier when the template body is positioned adjacent a pocket at the predetermined position of the template body relative to the pocket.

6. The template of claim 5, further comprising template position indicators for positioning the template body at a predetermined template body position relative to the pocket, whereby the protrusion indicates a predetermined vertical position of the ribbon assembly relative to the pocket when the template body is positioned at the predetermined template body position.

7. The template of claim 6, wherein the template body has a top edge and a bottom edge and is configured such that when the position indicators are aligned with the pocket to place the template body in the predetermined template body position, the ribbon assembly positioning guides are simultaneously positioned to fix a predetermined position of the ribbon assembly relative to the pocket and the template body, the template position indicators including horizontal alignment indicators to center said template body relative to the pocket and the bottom edge of the template body, the bottom edge being alignable along a top edge of the pocket.

8. The template of claim 7, wherein the ribbon assembly positioning guide includes a centering reference mark on the protrusion.

9. The template of claim 7, wherein the protrusion includes a support surface vertically positioned to coincide with a predetermined vertical position of the ribbon assembly relative to the template body and relative to the pocket when the template body is at the predetermined template body position.

10. The template of claim 9, wherein the support surface is a generally planar surface extending from the template body.

11. The template of claim 5, wherein the protrusion includes a planar support surface extending outwardly from the template body, the template body having a top edge with an elevation flush with the planar surface.

12. The template of claim 5, further comprising a gripper formed by a bottom edge of the template body adapted to engaged a top seam of the pocket.

13. A method of positioning an item on the front of a garment at a predetermined position relative to a pocket and at least partially over the pocket of the garment, said method comprising the steps of providing a template having a template body, a top edge and a bottom edge, said template further including, a ribbon assembly positioning guide positioned to locate a position of a ribbon assembly on the garment in spaced relation with the pocket and with the template, the ribbon assembly positioning guide including a protrusion extending outwardly to define a support surface and a supporting handle extending downwardly from the template body, the supporting handle including a footer portion engageable with the carrier when the template body is positioned at the predetermined template body position relative to the pocket to support the template thereagainst and an intermediate section, wherein the footer portion is positioned at a distal end of the supporting handle spaced inwardly from the intermediate section to engage the pocket or carrier when the template body is positioned adjacent the pocket at the predetermined position of the template body relative to the pocket;

aligning the template body along a top edge of the pocket, thereby centering the template body, to place the template body in the predetermined position of the template body relative to the pocket, whereby the ribbon assembly positioning guides are simultaneously positioned to fix the predetermined position of the ribbon assembly relative to the pocket and the template body; and with the template body in the predetermined template body position, engaging the ribbon assembly with the support surface, thereby fixing a predetermined vertical position of the ribbon assembly relative to the pocket;

wherein the aligning step further includes rotating the supporting handle such that the footer portion engages the pocket or carrier and the intermediate section is spaced from the pocket or carrier, thereby supporting the template body against the pocket.

14. The method of claim 13, wherein the ribbon assembly positioning guide includes a center positioning reference mark on the support surface, the aligning step including aligning the ribbon assembly with the center positioning reference mark to center the ribbon assembly.

15. The method of claim 13, wherein the garment includes a pocket having a raised top edge and the predetermined position of the ribbon assembly is above the pocket, the step of aligning the template body including aligning a bottom edge of the template body onto and along the raised top edge of the pocket, and aligning corresponding horizontal alignment reference points on the left and right sides of the front of the template body with the left and right upper corners of the pocket, respectively.

16. The method of claim 13, wherein the support surface is a planar surface, the aligning step including supporting the ribbon assembly on the planar surface forwardly of the template body and then directing the ribbon assembly inwardly toward the top edge of the template body.

* * * * *

UNITED STATES PATENT AND TRADEMARK OFFICE

CERTIFICATE OF CORRECTION

PATENT NO. : 8,359,763 B2
APPLICATION NO. : 12/657417
DATED : January 29, 2013
INVENTOR(S) : Matthew Bridger Allen It is certified that error appears in the above-identified patent and that said Letters Patent is hereby corrected as shown below:

In the Claims:

Claim 5, Column 19, line 9, insert -- handle -- after “supporting”.

Signed and Sealed this
Seventh Day of May, 2013

Teresa Stanek Rea
*Acting Director of the United States Patent and Trademark Office*